United States Patent
Specht et al.

(10) Patent No.: US 8,013,727 B2
(45) Date of Patent: Sep. 6, 2011

(54) DEVICE FOR DETECTING VEHICLE SEAT OCCUPANCY

(75) Inventors: Martin Specht, Feldafing (DE); Thomas Kilian, Mammendorf (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 422 days.

(21) Appl. No.: 12/131,146

(22) Filed: Jun. 2, 2008

(65) Prior Publication Data

US 2009/0015394 A1    Jan. 15, 2009

(30) Foreign Application Priority Data

Jul. 10, 2007   (DE) .................. 10 2007 032 171

(51) Int. Cl.
  *B60Q 1/00*   (2006.01)
(52) U.S. Cl. ................. 340/457.1; 340/457; 180/268
(58) Field of Classification Search ............... 340/457.1, 340/438, 439, 458, 459, 461, 469, 425.5, 340/457; 180/267, 268; 280/735
  See application file for complete search history.

(56) References Cited

U.S. PATENT DOCUMENTS

| | | | |
|---|---|---|---|
| 5,231,359 A | 7/1993 | Masuda et al. | |
| 6,076,239 A | 6/2000 | Kopetzky et al. | |
| 6,184,785 B1 | 2/2001 | Midorikawa | |
| 6,362,734 B1 * | 3/2002 | McQuade et al. | 340/457.1 |
| 2006/0290130 A1 | 12/2006 | Hall | |
| 2007/0057781 A1 * | 3/2007 | Breed | 340/457.1 |
| 2007/0114768 A1 | 5/2007 | Lennir | |
| 2007/0221428 A1 * | 9/2007 | Strutz et al. | 180/268 |

FOREIGN PATENT DOCUMENTS

| | | |
|---|---|---|
| DE | 4441184 A1 | 6/1995 |
| DE | 100002378 A1 | 8/2000 |
| DE | 69721815 T2 | 3/2004 |
| DE | 202004001895 U1 | 6/2005 |
| DE | 102005025963 A1 | 12/2006 |
| DE | 102006005047 B3 | 4/2007 |
| EP | 0870653 A1 | 10/1998 |
| EP | 0946381 B1 | 5/2003 |
| KR | 20-1999-0034161 U | 8/1999 |
| KR | 10-2006-0033827 A | 4/2006 |

* cited by examiner

*Primary Examiner* — Anh V La
(74) *Attorney, Agent, or Firm* — Markell Seitzman; Lonnie R. Drayer

(57) ABSTRACT

A device for detecting the occupancy status of a vehicle seat with an electrical capacity sensor device that is arranged in a seat belt buckle assigned to the vehicle seat and whose electrical capacity is altered relative to a reference potential (mass, ground) by the presence of a person occupying the vehicle seat and which, as a result, emits an electrical seat occupant presence output signal.

12 Claims, 2 Drawing Sheets

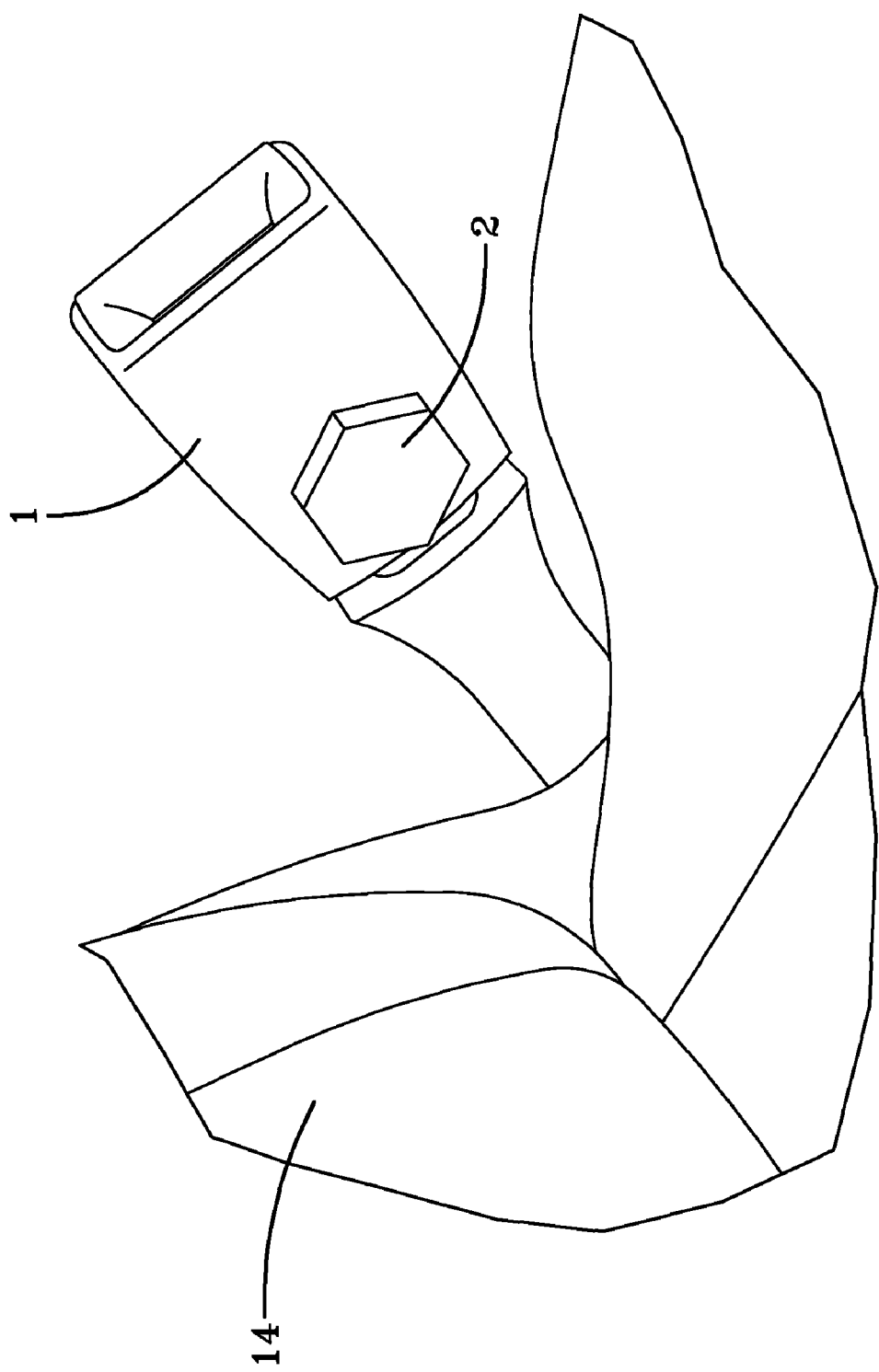

DEVICE FOR DETECTING VEHICLE SEAT OCCUPANCY

FIELD OF THE INVENTION

The invention relates to a device for detecting the occupancy status of a vehicle seat.

BACKGROUND OF THE INVENTION

DE 10 2005 025 963 A1 teaches a device wherein the presence of a person on the vehicle seat is detected with the aid of optical sensors. The sensor signal is sent to an image-analyzing device. The detection of seat occupancy by a weight signal transmitted by a seat-occupancy sensor system is disclosed in DE 10 2006 005 047 B3. DE 20 2004 001 895 U1 discloses detecting the occupancy status of a vehicle seat using a detector mat to acquire information regarding a localized force on the seat. The known devices require the installation of additional expensive sensor equipment in the vehicle seat or in the interior of the vehicle. In contrast, the present invention provides a device that detects the occupancy status of a vehicle seat with low equipment expense and small space requirements.

BRIEF DESCRIPTION OF THE DRAWINGS

FIG. 2 is a perspective view of a seatbelt buckle adjacent to a vehicle seat.

DETAILED DESCRIPTION OF THE INVENTION

Figure 1:
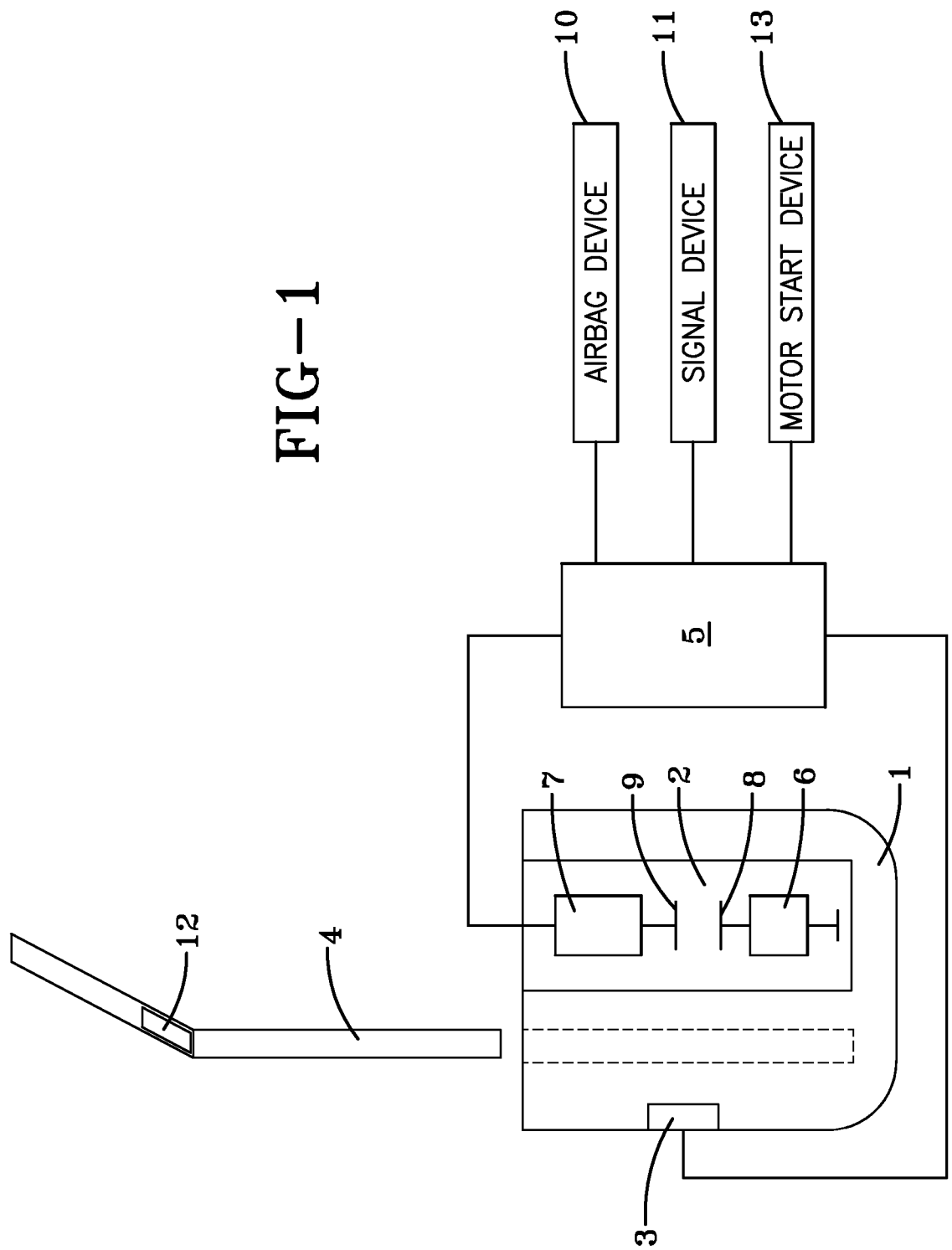
FIG. 1 is a diagrammatic view of a device for detecting occupancy of a vehicle seat.

An electrical capacity sensor device 2 is arranged in or on a seat belt buckle 1 associated with a vehicle seat 14. The seat belt buckle is a component of a seatbelt system, in particular a three-point seatbelt system. The electrical capacity of the electrical capacity sensor device is altered by a person occupying the vehicle seat relative to a reference potential, for example, mass potential or ground potential, and as a result the electrical capacity sensor device generates an electrical seat occupant presence signal. Seat occupant presence detection occurs on the basis of the electrical conductivity of the human body. The approach of a human body toward a signal electrode has an electrical voltage relative to a reference potential (mass, ground), such that the electrical field being emitted is influenced. The signal electrode may be frequency determining for the detection system in a known manner, such that the presence of the body of an occupant of the vehicle seat is detected by frequency measurement. The circuit structure of a capacity sensor device appropriate for this purpose is known from DE 10 2006 051 184 A1. The analysis device of the known capacity sensor device contains an oscillating circuit whose capacity may be altered or influenced by the capacity detecting the presence of a body. For the purpose of generating a seat occupant presence output signal, an analysis circuit may analyze a phase shift and/or change in amplitude, change in the flow of the current over time, or change in the voltage in the oscillating circuit. The necessary sensor electrodes and the analysis device, which is preferably implemented in a microcontroller or ASIC, may be arranged in or on the housing of the seat belt buckle in a space-saving manner.

The seat occupant presence output signal produced by the electrical capacity sensor device 2 and the electrical buckle locking signal may be analyzed for the purpose of controlling other functional units in the vehicle. For this purpose, these two signals may be supplied to a logic circuit 5. The analysis of these two signals may occur in such a way that, in the case of a positive seat occupant presence signal indicating a seat is occupied, an airbag device assigned to the occupied seat, for example, the driver's airbag in the steering wheel, and the side airbag for lateral head protection for the driver would be prepared for deployment. The airbag devices assigned to the passenger seat and the rear seats may be prepared in the same manner. This preparation occurs even before the vehicle's engine is started. To ensure that in the case of a rear impact to a stationary vehicle, the occupant(s) in the vehicle would be given the necessary protection by the activation of the airbags.

The exemplary embodiment shown includes a seat belt buckle 1 of a seatbelt system, in particular a three-point seatbelt system, in a vehicle. The seat belt buckle 1 is disposed adjacent to a vehicle seat 14, at a side of the vehicle seat. When the seatbelt is buckled, a buckle tongue 4 connected to the seatbelt is inserted into the seat belt buckle and locked into it in a known manner. The buckle locking status, and in particular the secured buckle locking status, is detected by a buckle locking detector 3, which may be provided on or in the seat belt buckle. The buckle locking detector 3 detects whether a buckle tongue connected to the seatbelt has been locked in the seat belt buckle and generates a corresponding electrical buckle locking signal. Buckle locking detectors of this type are known, for example, from DE 44 41 184 A1 and EP 0 870 653 A1.

An electrical capacity sensor device 2 is arranged in or on the seat belt buckle 1. This electrical capacity sensor device contains sensor electrodes 8, 9 between which an electrical field with a certain capacity is produced against a reference potential (mass or ground potential) by a generator 6. An analysis circuit 7 is attached to the sensor electrode arrangement 8, 9 that detects a change in the electrical capacity between the sensor electrodes 8, 9. A change in capacity of this type is caused by the body of a vehicle occupant located on the vehicle seat. In this case, the analysis circuit 7 produces a positive seat occupant presence output signal. The analysis circuit 7 contains an oscillating circuit, in particular an LC network whose capacity is influenced by the capacity between the sensor electrodes 8, 9. Exemplary embodiments of the capacity sensor device 2 are described in detail in DE 10 2006 051 184 A1. U.S. Pat. No. 5,231,359 teaches a capacitive sensor similar to that described in DE 10 2006 051 184 A1 and is incorporated herein by reference in its entirety for the purpose of teaching the workings of a capacitive sensor of the type that may be employed in the practice of the present invention.

The outputs of the buckle locking detector 3 and the capacity sensor device 2 are connected to a logic circuit 5. In this logic circuit 5, the seat occupant presence output signal from the capacity sensor device 2 and the buckle locking signal of the buckle locking detector 3 are evaluated with regard to the actuation of additional functional units in the vehicle. The logic circuit 5 may be implemented in the on-board computer of the vehicle. However, it is also possible for the logic circuit 5 to be implemented in the microprocessor of the analysis device 7.

The logic circuit 5 may be used to control the airbag device 10 assigned to the respective vehicle seat and having one or more airbag devices assigned to the vehicle seat. A signal device 11 may be activated by the logic circuit to transmit a "fasten seat belt" signal in an acoustic or optical manner. The logic circuit 5 may control a vehicle's engine starting device 13. The control of these functional units in the vehicle occurs dependent upon the seat occupant presence output signal and the buckle locking signal. The control of the airbag device 10 may occur in such a way that upon in the event of a positive seat occupant presence output signal from the capacity sensor device 2, i.e., when the vehicle occupant has sat in the seat, the assigned airbag devices 10 are prepared for deployment.

In the case of a positive seat occupant presence output signal and a lack of a buckle locking signal, in particular after the vehicle's engine has been started, a "fasten seat belt" signal will be initiated in an optical and acoustical manner. In this manner, the respective vehicle occupant is made aware that he or she must fasten the assigned seat belt. The control of the signal device 11 may occur in such a way that, in the case of a positive presence output signal and a lack of a buckle locking signal, the acoustic and/or optical "fasten seat belt" signal is preferably produced before the vehicle's engine is started.

In the case of a positive seat occupant presence output signal and a lack of a buckle locking signal, it is possible to block the vehicle's engine from starting. The vehicle's engine starting device 13 may be controlled in such a way that it only allows the vehicle's engine to start if both signals, namely the seat occupant presence output signal and the buckle locking signal, for each occupied vehicle seat, and in particular the driver's seat are present in the logic circuit 5. If one of the two signals is missing, in particular the buckle locking signal, then the start of the vehicle's engine is blocked.

It is possible for a transponder 12 to be arranged on the buckle tongue 4 in an inventive manner having a code assigned to the buckle tongue 4 and the seat belt buckle 1. The transponder is preferably a passive transponder, in particular an RFID transponder. The code query occurs in a wireless manner and may be received with the aid of a correspondingly embodied detector that is provided on the seat belt buckle 1. This may be the buckle locking detector 3 which, in addition to its function described above, also has an RFID (radio frequency identification) function. The buckle locking signal is sent to the logic circuit 5 only if the buckle tongue 4 assigned to the seat belt buckle 1 has been locked in the seat belt buckle 1. Only then, as described above, are the corresponding additional functions for the assigned airbag, seat belt buckling, and vehicle's engine starting activated.

In an advantageous manner, the capacity sensor device is activated by the opening of the vehicle door or by remote control. When the vehicle door is locked, for example, by remote control, the capacity sensor device may be deactivated; naturally, a standby situation may be maintained for the capacity sensor device while the vehicle is parked as well.

Many changes and modifications in the above-described embodiments of the invention can, of course, be carried out without departing from the scope thereof. Accordingly, that scope is intended to be limited only by the scope of the appended claims.

The invention claimed is:

1. A device for detecting the occupancy status of a seat of a vehicle comprising a sensor device for detecting the presence of a person on the seat and an analysis unit analyzing the sensor signal, with the sensor device being arranged in the seat belt buckle assigned to the seat, the sensor device being an electrical capacity sensor device whose electrical capacity is altered by the presence of a person occupying the seat and which, as a result, emits an electrical seat occupant presence output signal.

2. The device according to claim 1 wherein the seat belt buckle includes a buckle locking detector that detects the locking of a buckle tongue in the seat belt buckle and emits an electrical buckle locking signal.

3. The device according to claim 2 wherein the outputs of the electrical capacity sensor device and the buckle locking detector are connected to a logic circuit.

4. The device according to claim 3, characterized in that, in the case of a positive seat occupant presence output signal, an airbag device assigned to the occupied seat is prepared for deployment.

5. The device according to claim 3 wherein, in the case of a positive seat occupant presence output signal and a lack of a buckle locking signal, a signal device is activated by the logic circuit to initiate a "fasten seat belt" signal.

6. The device according to claim 3 wherein, in the case of a positive seat occupant presence output signal and a lack of a belt locking signal, a vehicle's engine starting device is actuated by the logic circuit to block the vehicle's engine from starting.

7. The device according to claim 1 wherein the capacity of an oscillating circuit located in an analysis circuit of the electrical capacity sensor device may be altered by the capacity between sensor electrodes of the electrical capacity sensor device detecting the presence of a person occupying the seat.

8. The device according to claim 1 wherein the electrical capacity sensor device may be activated by opening a vehicle door.

9. The device according to claim 1 wherein the capacity device may be deactivated by locking a vehicle door.

10. The device according to claim 2 wherein the buckle tongue has a transponder fixed thereto that carries a code assigned to the buckle tongue that is detected by a detector provided on the seat belt buckle.

11. The device according to claim 10 wherein the buckle locking detector detects the code.

12. A device for detecting the occupancy status of a seat of a vehicle comprising a sensor device for detecting the presence of a person on the seat and an analysis unit analyzing the sensor signal, with the sensor device being arranged in the seat belt buckle assigned to the seat, the sensor device being an electrical capacity sensor device whose electrical capacity is altered by the presence of a person occupying the seat and which, as a result, emits an electrical seat occupant presence output signal, and the seat belt buckle includes a buckle locking detector that detects the locking of a buckle tongue in the seat belt buckle and emits an electrical buckle locking signal, the outputs of the electrical capacity sensor device and the buckle locking detector being connected to a logic circuit, the buckle tongue having a transponder fixed thereto that carries a code assigned to the buckle tongue that is detected by a detector provided on the seat belt buckle.

* * * * *